(12) United States Patent
Livingston

(10) Patent No.: US 7,461,463 B1
(45) Date of Patent: Dec. 9, 2008

(54) ECCENTRICITY GAUGE FOR WIRE AND CABLE AND METHOD FOR MEASURING CONCENTRICITY

(75) Inventor: Rod Livingston, Richmond, IN (US)

(73) Assignee: Beta Lasermike, Inc., Dayton, OH (US)

( * ) Notice: Subject to any disclaimer, the term of this patent is extended or adjusted under 35 U.S.C. 154(b) by 23 days.

(21) Appl. No.: 11/749,367

(22) Filed: May 16, 2007

(51) Int. Cl.
G01B 7/12 (2006.01)
G01B 11/08 (2006.01)
G01N 21/00 (2006.01)

(52) U.S. Cl. .................. 33/550; 33/501.02; 356/635; 324/230

(58) Field of Classification Search .............. 33/550, 33/501.02; 356/635; 324/230
See application file for complete search history.

(56) References Cited

U.S. PATENT DOCUMENTS

| 4,064,633 | A | * | 12/1977 | Wertepny | 33/550 |
| 4,086,044 | A | | 4/1978 | Sikora | |
| 4,641,525 | A | * | 2/1987 | Merki | 73/865.8 |
| 5,214,376 | A | * | 5/1993 | Sikora | 324/207.15 |
| 5,528,141 | A | | 6/1996 | Kyriakis | |
| 5,541,509 | A | * | 7/1996 | Kyriakis | 324/230 |
| 5,729,622 | A | * | 3/1998 | Csipkes et al. | 382/151 |
| 5,841,542 | A | * | 11/1998 | Milana et al. | 356/635 |
| 7,068,359 | B2 | | 6/2006 | Studer | |
| 7,116,097 | B2 | * | 10/2006 | Revankar et al. | 324/207.13 |
| 7,206,065 | B2 | * | 4/2007 | Anderson et al. | 356/73.1 |
| 2004/0150811 | A1 | * | 8/2004 | Ingles et al. | 356/73.1 |

* cited by examiner

*Primary Examiner*—Christopher W Fulton
(74) *Attorney, Agent, or Firm*—R. William Graham

(57) ABSTRACT

A device for measuring the location of a conductor within an insulating sheath using three measuring planes, in which at least one measuring plane is able to locate the conductor and at least one is able to locate the periphery of the outer sheath.

12 Claims, 4 Drawing Sheets

ECCENTRICITY GAUGE FOR WIRE AND CABLE AND METHOD FOR MEASURING CONCENTRICITY

BACKGROUND OF THE INVENTION

1. Field of Invention

The present invention relates to a system for measuring concentricity and diameter of cable and wire. More particularly, the invention relates to a system and method for non-contact measurement of concentricity and diameter of cable and wire.

2. Related Art

During the manufacture of insulated cable and wire, it is desirable to insure that the conductor (e.g., wire) is well centered within the insulating material which covers the wire. To measure the concentricity, it is most convenient to locate and quantify the outer periphery of the insulating material and then measure the location of the conductor within.

For this discussion, the conductor is made of a conducting inner material. An outer jacket will include the insulating material. The combination of the two will be called the cable. The difference between the location of the center of the conductor and the center of the outer jacket is defined as the eccentricity.

It is advantageous to utilize non-contact measuring devices in measuring cable as it is formed because the insulating material is warm, soft and easily damaged when it comes out of an extruder. Optical or magnetic devices are typically used for this purpose. During the forming process, the cable is constantly moving longitudinally in the extrusion process. The cable also experiences lateral movement because of vibration in the taught wire. Historically, the practice is to measure the outer insulation diameter and conductor location at the same point along the axis of the cable to gain the best reading of eccentricity.

The current thought is to employ optical and magnetic measuring devices which reside in the same measuring plane, and orthogonal to the longitudinal axis of the cable. Currently, it is thought if the planes are in separate locations along the axis of the cable, it is difficult to distinguish between true eccentricity and angular misalignment of the cable. The measuring devices would measure at the same time, otherwise, the cable can move laterally in the time interval and spoil the measurement.

A previous device as seen in U.S. Pat. No. 5,528,141 to Kyriakis discloses an optical plane and magnetic measuring plane, and speaks of measuring at the same point on the wire, but not necessarily simultaneously in the same plane. Another device seen in U.S. Pat. No. 7,068,359 to Studer discloses two magnetic sensor coils placed on either side of an optical plane. The coils are connected together in such a way that they form a single magnetic measuring plane coinciding with the optical measuring plane and determine field intensity in front of and back of the optical measuring plane correlating the field intensities to determine an active inductive measuring plane which coincides with the optical measuring plane. The concept is to measure at a single time reference.

There remains a need to improve the art. The present invention improves the art by providing a novel system of placing the measuring devices in separate longitudinally spaced areas in order to provide a reliable measuring system and one in which permits increased space for maintenance, repair and cleaning of parts.

SUMMARY OF THE INVENTION

It is an object to improve measuring systems for cable and wire.

It is another object to improve non-contact measuring for measuring eccentricity and diameter of cable and wire.

It is a further object to provide a three point axially spaced measuring system for cable and wire.

Another object is to provide a method of determining location of a wire within a cable.

With the present invention, it is desirable to place optical and magnetic sensors in different measuring planes. This alleviates a cramped environment in the measuring area and provides room for the light beams and for magnetic detectors. This is also improves the ability to keep sensors clean in an environment that is inherently dirty and requires dirt shields and air jets in a confined area.

Accordingly, one aspect of the present invention is directed to an apparatus for measuring eccentricity and diameter of an elongated object moving generally along a z axis. The apparatus includes at least three separate measuring devices axially spaced along the z-axis in a manner such that each device can obtain for storage a measurement of the object in a distinct measuring plane at a predetermined point of the z-axis, wherein each plane is oriented at a predetermined degree of angle, e.g., perpendicular, with respect to the z-axis. The measurements can be taken at a given predetermine time and x-y points measured for an area to be measured of the object. From these three sets of coordinates, eccentricity can be determined and used in deriving the measurements from the predetermined point. A computer based device can be employed for receiving and storing the measurements and determining eccentricity. In the case of measuring cable including an insulating jacket and an inner wire, for example, at least one of the devices is capable of measuring the location of the wire and one of the devices is capable of measuring the diameter of the jacket and the remaining device can be for measuring either the diameter of the wire or jacket.

The apparatus can include, for example, and be arranged in one of four different configurations:

- Two optical devices forming planes on either side of a magnetic device forming a magnetic plane;
- Two optical devices forming planes to one side of a magnetic device forming a magnetic plane;
- Two magnetic devices forming planes to one side of an optical device forming an optical plane; or
- Two magnetic devices forming planes on either side of an optical device forming an optical plane, wherein the devices are oriented such that the planes maintain a common angle with respect to the cable as it moves.

The invention also provides a method for measuring eccentricity and diameter of an elongated object moving generally along a z axis. The method includes the steps of (a) employing at least three separate measuring devices axially spaced along the z-axis in a manner such that each device can obtain a measurement of the object in a distinct measuring plane at a predetermined point of the z-axis, wherein each plane is oriented at a predetermined degree of angle, e.g., perpendicular, with respect to the z-axis; (b) taking a measurement with each device at a given predetermine time as the object moves thereby in order to obtain three sets of x-y-z coordinates for an area to be measured of the object; (c) using the three sets of coordinates to determine eccentricity of the object and (d) employing the eccentricity to calculate the diameter of the object. The method can preferably be employed for measuring cable and wire.

PREFERRED EMBODIMENT

Figure 1A:
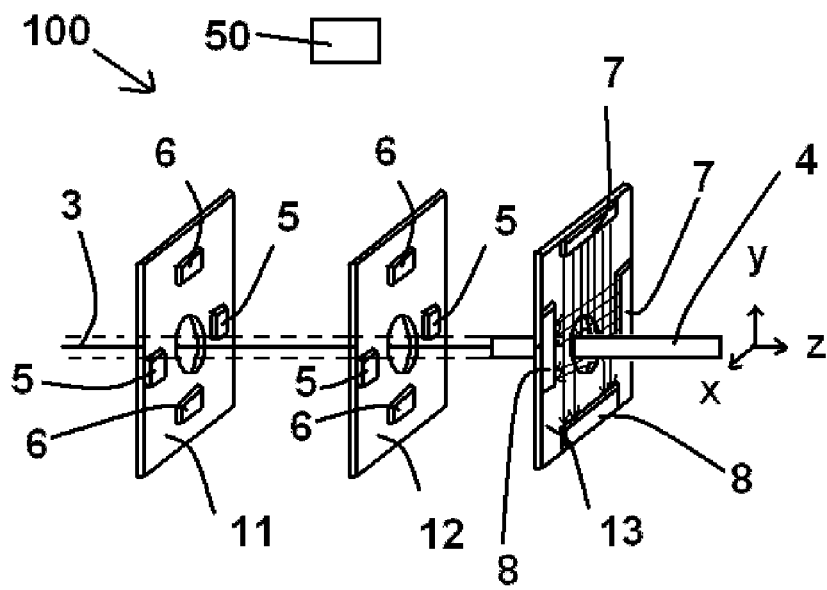
FIG. 1A is a perspective schematic of an embodiment of the invention.
Figure 1:
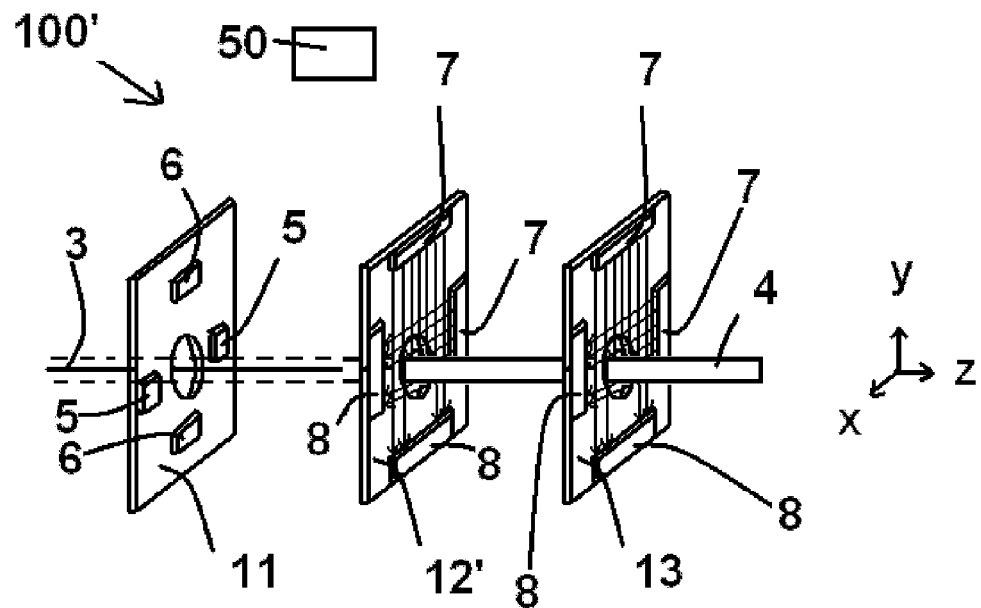
FIG. 1B is a perspective schematic of an embodiment of the invention.
FIG. 1C is a perspective schematic of an embodiment of the invention.
FIG. 1D is a perspective schematic of an embodiment of the invention.
Figure 1:
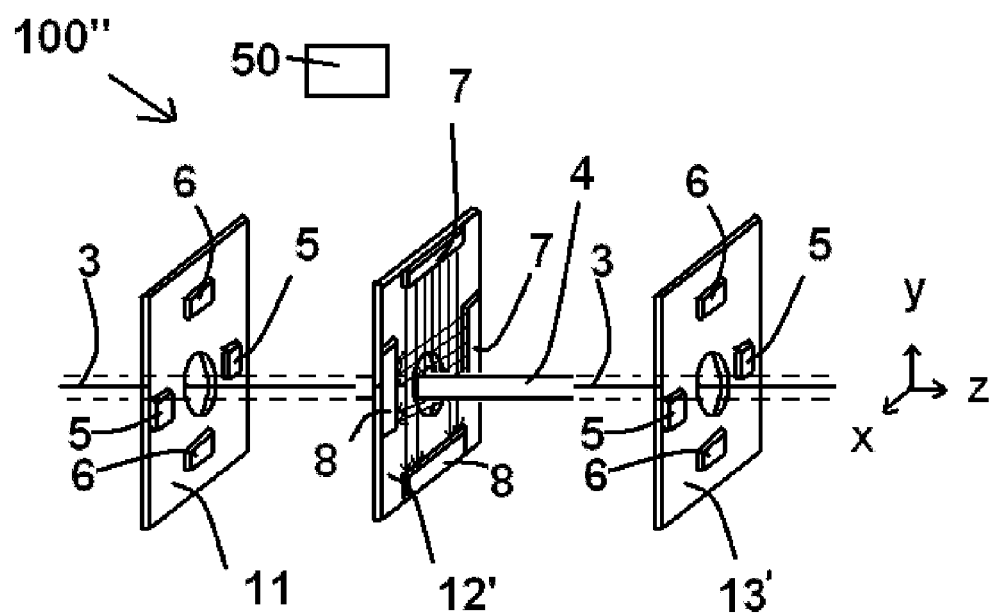
Figure 1:
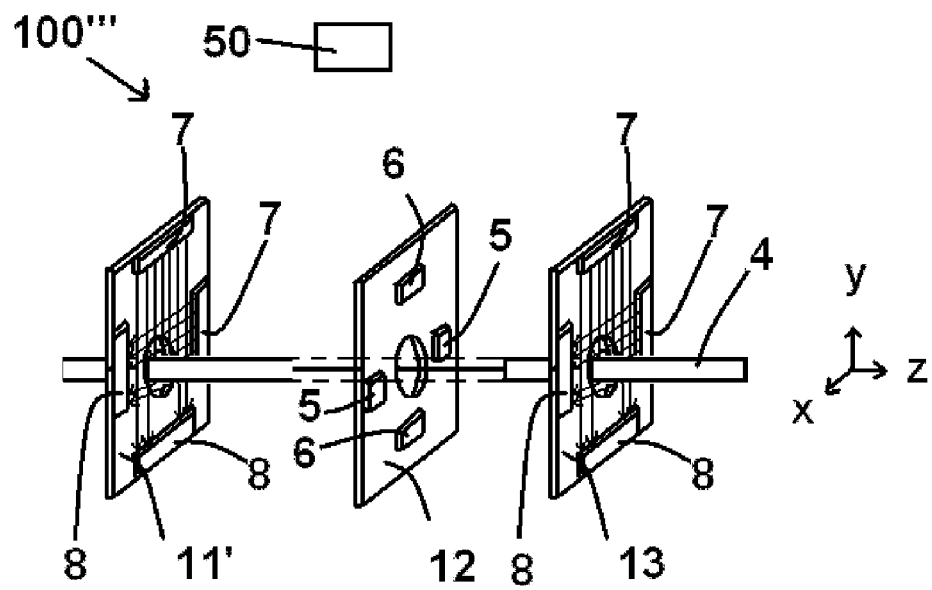
Figure 2:
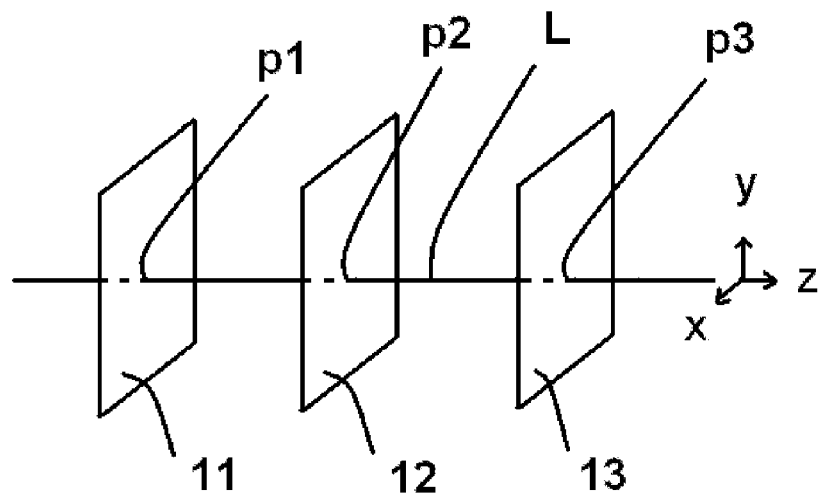
FIG. 2 is a perspective schematic illustrating three distinct planes of measurement.

Referring now to the drawings, the apparatus and method of the present invention is generally referred to by the numerals 100, 100', 100", and 100''' and is particularly well suited for measuring eccentricity and diameter of cable 4, for example. Like numerals refer to like parts. During the extrusion process, the cable 4 is under tension, and is thus essentially a straight line. Mathematically, two points in space define a straight line, so that if one were to measure two points simultaneously, say of the outer jacket 9 or the inner conductor 3, one would know the location of an axis (z-axis as seen in FIGS. 1 and 2) of the cable 4.

The present invention can employ dual-axis optical micrometers 7, 8 known in the art of wire and cable industry to measure diameters by precisely measuring the shadows cast by beams of light. Typically, but not necessarily, the beams 15x and 15y are set up at right angles to each other and the cable 4 runs through the intersection, orthogonal to both beams. The crossed beams establish an x-y measuring plane in which one beam 15x measures the x coordinate and the other beam 15y measures the y coordinate. Typically, but not necessarily, the cable 4 runs orthogonally through the measuring plane 13.

In one case, the invention can employ a pair of dual-axis optical micrometers 7, 8 separated by some distance, one may locate the position of the outer jacket 9 in two measuring planes along the z axis of the cable 4. These points define the axis of the cylinder of insulation as a line in space. By measuring the location of the inner conductor 3 in a third plane, not coincident with two said optical planes, one can establish how far from the previously established line in space the conductor 3 is disposed. The distance the conductor 3 falls from the previously defined line determines the eccentricity.

In practice, the spatial sequence of the measurements does not matter as long as there are at least three measurement points p1, p2 and p3 along the z-axis, and there is a mix of optical and magnetic measurements, and they are taken simultaneously for this purpose. Thus, the magnetic measuring planes 11 and 12 may be on either side or one side of the optical measuring plane 13 or in the case of using two optical measuring planes these can be situated on either side or on one side of the magnetic measuring plane. In the case of measuring the internal conductor 3 in two planes and measuring the outer jacket 9 in the single third plane, the order of measuring planes can be various.

The invention establishes the concept of using the three-dimensional definition of the z axis of the cable 4 as a line in space as defined by two measuring points, and testing a third measured point to that line, and establishing its distance from that line as eccentricity. Additionally, the invention establishes the concept of mathematically describing a conductor's central axis z as a line in space defined from the position of two magnetically measured points p1 and p2, for example, where the conductor 3 pierces two parallel measuring planes 11 and 12. That line is mathematically extrapolated to predict the point p3 where it pierces a third parallel optical measuring plane 13, wherein four points 10 on the periphery of the outer sheath or jacket 9 of insulating material are measured. The distance between the extrapolated point and the geometric center of the four optically measured points determines the eccentricity.

For the sake of simplicity only the third and preferred arrangement is described; which is, two magnetic measuring devices on one side of an optical plane. This is shown in FIG. 1A. The description for the other three arrangements is similar.

According to this arrangement, to measure the eccentricity a device must first establish a line in space z as defined by the center of the conductor 3 and then measure how far away from the established line that center of the periphery of the outer jacket 9 lies.

To establish a first point in space, the apparatus 10 can employ a set of four magnetic field sensors 5 and 6 arranged in plane 11 generally perpendicular to the z axis of the cable 3. An alternating current is induced into conductor 4 to establish an oscillating magnetic field.

Such a field diminishes with distance from the conductor's axis z thus allowing the sensors 5 and 6 to measure the location of the conductor 3. Preferably, the sensors 5 and 6 are set in pairs in plane 11 on opposite sides of the cable 4 so that by subtracting one signal from the other a nominally linear indication of the conductor's location within the particular plane 11 is determined. Thus, two such pairs 5 and 6 are provided in the plane 11 so that x and y locations can be established, the z axis being the axis of the cable 4. The cable 4 is positioned approximately in the center of plane 11 and approximately equidistant from the four sensors 5 and 6. The sensors 5 and 6 can be field sensing coils sometimes called search coils or they may be of any of the types of sensors on chips called magenetorestrictive, magnetostrictive, or Hall devices. To create a magnetic field for the sensors to measure, cable 3 is excited with an alternating current by some external current source, not shown, preferably an inductive device positioned some distance from the present invention.

By measuring the intensities of the two x sensors 5 and subtracting one magnitude from the other, a measure of the conductor's location in the x dimension can be ascribed a number. Similarly, using the two y sensors 6 establishes a y location. Thus the x and y coordinates are established at magnetic measuring plane 11.

To establish the second point, an identical arrangement of magnetic sensors 5 and 6 is located a short distance away along the z axis from the first set of sensors 5 and 6 and in plane 12 generally parallel to the first plane 11. In the same way as the first measurement, x and y components locate the center of the conductor 4 where it pierces this second plane 12. These two sets of x-y components separated by some distance along the cable axis z, uniquely define the center of the conductor 3 within the apparatus.

Thus, identifying two unique points P1 and P2 in two parallel planes 11 and 12 establishes a unique line in space L that will pierce a third measuring plane 13, generally parallel to the first two planes 11 and 12, at a single and unique, but unmeasured, point P3 as shown in FIG. 2. By extrapolation, the location of the point P3 in the third plane 3 can be predicted. The third measuring plane 13 is fitted with optical measuring devices 7 and 8 in FIG. 3. The optical measuring devices utilized in plane 13 can be one of two types, for example. These are well-known devices in the industry called "camera gauges" and "scanners." They are typically used to measure diameters of cables and wires, but can be configured to measure location. In both types, a projected beam of light is cast toward the object to be measured and the size of the shadow is measured to typically sub-micron precision. When such a device is fitted with two crossed beams, they can measure x and y locations of an object.

Figure 3:
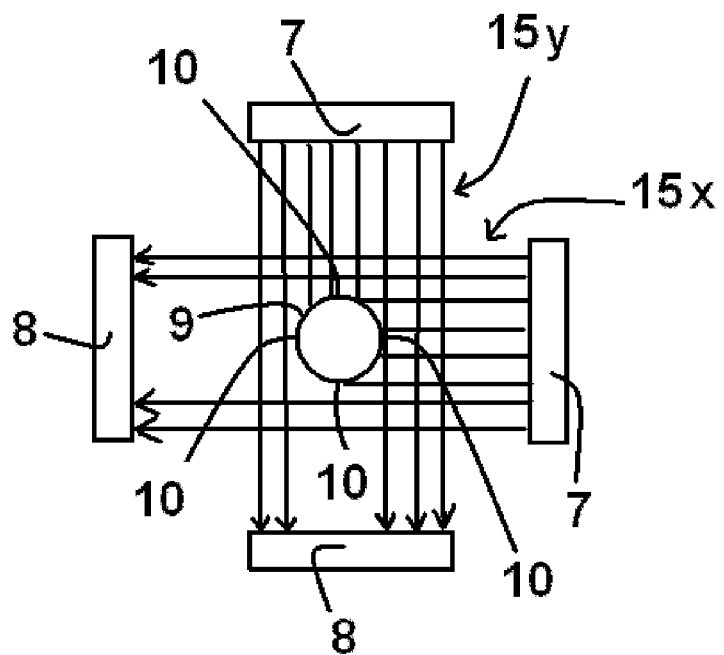
FIG. 3 illustrates a plan view of an optical measuring device of the invention.
Figure 4:
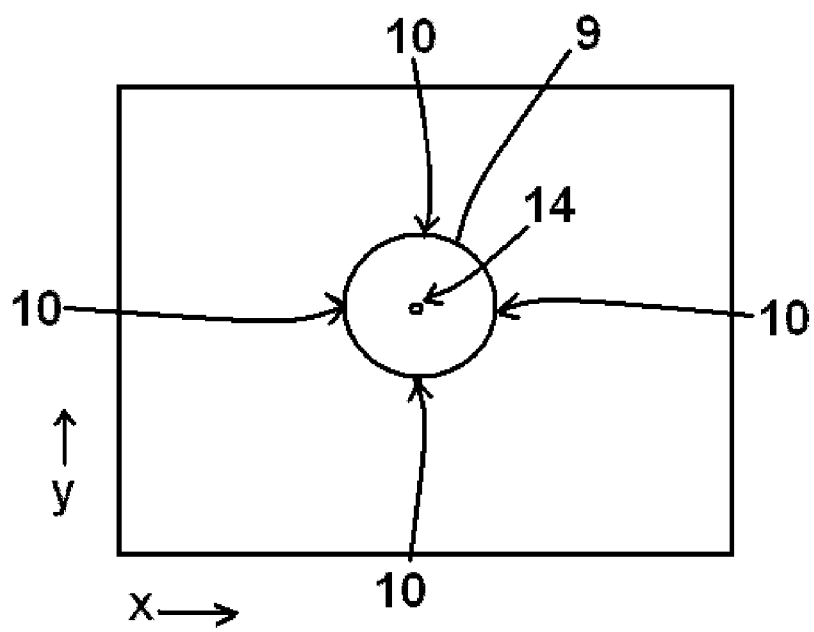
FIG. 4 shows the location of four points on a periphery of an insulating jacket and geometric mean thereof.

The optical devices 7 and 8 determine the location of four points 10 on the generally circular periphery of the insulating material or jacket 9. The geometric mean of the four points 10 is a unique point 14 in the third measuring plane 13. In FIG. 3, the distance between the optically determined point 14 and the extrapolated point P3 in the third measuring plane 13 is the eccentricity. It is essentially the center of the conductor as related to the center of the insulation.

The positions of the three measuring planes can be correlated to each other to aid such that every pair of points in the first two measuring planes 11 and 12 are to predict the coordinates of a point in the third plane 13. A bare or un-insulated wire is a nearly perfect concentric cable in that its insulation layer is nominally zero. To the degree that the wire can be made straight, the three planes can be correlated by measuring the x-y locations of the bare wire in each of the three planes. To correct for nonlinearity of the measuring devices, it suffices to collect data for a multitude of positions and angles of the cable 4. The collected data consists of the x-y locations of the bare wire in the three planes 11, 12 and 13. From this a least squares fit can be performed to create an equation that is able map every pair of points from the first two planes into a point in the third. A computer based device 50 can be provided which is operably connected to the sensors 5, 6 and 7 and 8 and which includes software for performing the computational operations described herein. Sensors used herein can be either to detect absolute magnitude or angle to establish position.

By so providing, the instant invention provides for a more dynamic method and measuring apparatus for determining eccentricity and diameter for cable and wire. Further, the invention provides for an easier work, maintenance and repair environment for measuring cable and wire.

What is claimed is:

1. An apparatus for measuring eccentricity and diameter of an elongated object moving generally along a z axis, which comprises:
   at least three separate measuring devices axially spaced along the z-axis in a manner such that each device can obtain for storage a measurement of the object in a distinct measuring plane at a predetermined point of the z-axis, wherein each plane is oriented at a predetermined degree of angle with respect to the z-axis and each said device is equipped to obtain for storage a measurement of the object at a given predetermined time and actual x-y coordinates; and
   a computer based device operably connected to said measuring devices having software means for receiving and storing said three sets of actual measured coordinates, employing two sets of said actual coordinates to derive a projected third set of coordinates and calculating eccentricity by accounting for a difference in the projected third set of coordinates between the actual third set of coordinates.

2. The apparatus for measuring eccentricity and diameter of an elongated object moving generally along a z axis of claim 1, wherein the object is a cable including an insulating jacket and an inner wire and a first of said devices is capable of measuring diameter of the wire and a second of said devices is capable of measuring diameter of the jacket and a third of said devices is capable of measuring one of the diameter of the wire and jacket.

3. An apparatus for measuring eccentricity and diameter of an elongated object moving generally along a z axis of claim 1, wherein at least one of said devices includes an optical measuring device and one of said devices includes a magnetic measuring device.

4. An apparatus for measuring eccentricity and diameter of an elongated object moving generally along a z axis of claim 3, which is further characterized to include two optical measuring devices forming planes on either side of said magnetic measuring device forming a magnetic plane.

5. An apparatus for measuring eccentricity and diameter of an elongated object moving generally along a z axis of claim 3, which is further characterized to include two optical measuring devices forming planes to one side of said magnetic measuring device forming a magnetic plane.

6. An apparatus for measuring eccentricity and diameter of an elongated object moving generally along a z axis of claim 3, which is further characterized to include two magnetic measuring devices forming planes to one side of said optical measuring device forming an optical plane.

7. An apparatus for measuring eccentricity and diameter of an elongated object moving generally along a z axis of claim 3, which is further characterized to include two magnetic measuring devices forming planes on either side of said optical measuring device forming an optical plane.

8. A method for measuring eccentricity and diameter of an elongated object moving generally along a z axis; which comprises the steps of:
   (a) employing at least three separate measuring devices axially spaced along the z-axis in a manner such that each device can obtain a measurement of the object in a distinct measuring plane at a predetermined point of the z-axis, wherein each plane is oriented at a predetermined degree of angle with respect to the z-axis;
   (b) taking a measurement with each device at a given predetermine time as the object moves thereby in order to obtain three sets of x-y coordinates for an area to be measured of the object; and
   (c) using the three sets of coordinates to determine eccentricity of the object.

9. The method of claim 8, wherein the object is a cable.

10. The method of claim 8, which further includes employing a computer-based device to perform step (c).

11. The method of claim 8, wherein step (a) is characterized such that said separate measuring devices are equipped to obtain for storage said measurement and further characterizes step (c) to include employing a computer based having software thereon to manipulate said coordinates to determine eccentricity.

12. A method for computing a location of a conductor within an insulating sheath, which includes the steps of:
   (a) employing at least three measuring planes wherein at least one plane is able to measure the location of the inner conductor to derive a first set of coordinates of a first plane and at least one plane is able to measure the location of the outer sheath to derive a second set of coordinates of a second plane, and the remaining plane is able to measure one of the location of the outer sheath and the location of the inner conductor to derive a third set of coordinates in said third plane; and (b) using said first set of said coordinates and said second set of said coordinates to derive a projected set of coordinates in said third plane of said planes and comparing said projected set of coordinates to said third set of coordinates to determine eccentricity and location of said conductor within said sheath.

* * * * *